(12) United States Patent
Chesner et al.

(10) Patent No.: US 6,712,979 B2
(45) Date of Patent: Mar. 30, 2004

(54) ENCLOSED EXCAVATOR FOR LOW MOISTURE CONTAMINATED SEDIMENT REMOVAL

(76) Inventors: Warren Howard Chesner, c/o Chesner Engineering, P.C., 2171 Jericho Turnpike, Commack, NY (US) 11725; James Melrose, 600 Robinson Rd., Greenport, NY (US) 11944

( * ) Notice: Subject to any disclaimer, the term of this patent is extended or adjusted under 35 U.S.C. 154(b) by 42 days.

(21) Appl. No.: 10/215,639

(22) Filed: Aug. 10, 2002

(65) Prior Publication Data

US 2002/0185424 A1 Dec. 12, 2002

Related U.S. Application Data

(63) Continuation of application No. 09/812,996, filed on Mar. 20, 2001, now Pat. No. 6,432,303.
(60) Provisional application No. 60/190,809, filed on Mar. 21, 2000, and provisional application No. 60/197,551, filed on Apr. 17, 2000.

(51) Int. Cl.[7] .................................................. E02F 3/28
(52) U.S. Cl. ........................ 210/747; 210/170; 37/341; 37/345; 37/195; 405/8; 405/10
(58) Field of Search ............................... 210/170, 242.1, 210/241, 747; 37/318, 320, 341, 345, 195; 405/8, 10, 12

(56) References Cited

U.S. PATENT DOCUMENTS

| 692,557 | A | * | 2/1902 | Swenson | 405/10 |
| 852,713 | A | * | 5/1907 | Gardner | 405/10 |
| 1,047,233 | A | * | 12/1912 | Jackson | 37/318 |
| 5,173,182 | A | * | 12/1992 | Debellian | 210/170 |
| 5,561,922 | A | * | 10/1996 | Lynch | 37/341 |
| 5,823,708 | A | * | 10/1998 | Dwight et al. | 405/12 |
| 6,038,795 | A | * | 3/2000 | Navarro | 37/341 |
| 6,637,135 | B2 | * | 10/2003 | Chesner et al. | 37/318 |

* cited by examiner

Primary Examiner—Christopher Upton
(74) Attorney, Agent, or Firm—Alfred M. Walker

(57) ABSTRACT

A system and method removes contaminated sediments during mechanical dredging operations, while maintaining a predetermined low moisture content of the contaminated sediments. The system uses a specially designed positive pressure controlled enclosure or enclosed excavator that houses a mechanical bucket and prevents ambient water from contacting the sediment during the excavation process.

11 Claims, 1 Drawing Sheet

ENCLOSED EXCAVATOR FOR LOW MOISTURE CONTAMINATED SEDIMENT REMOVAL

RELATED APPLICATIONS

This application is a continuation of U.S. application Ser. No. 09/812,996, filed on Mar. 20, 2001, now U.S. Pat. No. 6,432,303; which claims the benefit of U.S. Provisional Application No. 60/190,809, filed on Mar. 21, 2000 and of U.S. Provisional Application No. 60/197,551, filed on Apr. 17, 2000.

TECHNICAL FIELD OF THE INVENTION

This application relates to a process for removing contaminated sediments from the bottom of lakes, reservoirs, rivers, streams, and other water bodies, while at the same time minimizing the moisture content present in these extracted sediments.

BACKGROUND OF THE INVENTION

Current methods of dredging can be divided into two general categories. They include mechanical dredging and hydraulic dredging. The fundamental difference between these categories is in the form in which the sediments are removed. Mechanical dredges remove the sediments directly with clamshell-type buckets. The operation consists of lowering the bucket with a crane to the bottom of the waterway, scooping or extracting the sediment, and bringing the sediment to the surface for disposal (typically in a dredge barge). Hydraulic dredges, sometimes referred to as vacuum dredges, are designed to vacuum up bottom sediments. Unless the sediments are very loose, vacuum dredges require cutter heads or alternative means to dislodge the dredge material so that the sediment can be vacuumed into the dredge head. Mechanical dredging operations typically yield much lower liquid to solid ratios (30 to 70 percent by weight) compared to hydraulic dredges (less than 1 to 10 percent by weight).

Due to the very high cost of contaminated sediment removal and disposal, which is typically priced on the basis of $ per unit volume or $ per unit weight (e.g., $ per cubic yard or $ per ton), the presence of moisture in the sediment will unavoidably raise the price of a dredging cleanup. The higher the moisture content, the higher the cost of disposal.

As previously noted, mechanical dredges tend to produce less moisture per weight of mud (lower liquids to solids ratio), but the sediment is exposed to the water column during the excavation process, which tends to supersaturate the excavated sediment. Due to the very high moisture content associated with hydraulic or vacuum dredging operations, the muds collected from such operations typically employ costly dewatering processes to try to reduce the quantity of moisture in the mud, thereby reducing the overall disposal cost.

The invention being disclosed herein also relates to the development of a system equipped to collect sediment from the marine environment with minimal moisture content, thereby reducing the cost of disposal over that of conventional dredging methods.

OBJECTS OF THE INVENTION

It is therefore an object of this invention to provide for the removal of sediments from the subsurface of a water body with low moisture, closely approximating the in-situ moisture content of the mud sample.

It is further an object of the present invention to improve over the disadvantages of the prior art.

SUMMARY OF THE INVENTION

In this embodiment, the system provides for housing a mechanical bucket in a specially designed enclosure into which positive pressure, equivalent to the hydrostatic pressure present at the corresponding submergence depth, is introduced into the enclosure to prevent water from entering the enclosure and providing the means to submerge, excavate and retrieve the sediment in a dry environment. As a result, such sediments can be recovered at a moisture content that approximates that of the in-situ condition of the sediment.

The operation of this system includes the following steps:
a) enclosing a dredge bucket within a sealed housing having an openable door;
b) providing a source of positive air pressure to said housing;
c) maintaining said positive air pressure at an amount equal to a predetermined hydrostatic pressure imposed by a surrounding water column surrounding said housing, thereby preventing the introduction of water from said surrounding water column into said housing;
d) submersing said housing having said bucket down to the in situ contaminated sediments to be dredged;
f) extending said bucket into said in situ contaminated sediments and collecting the contaminated sediments having said predetermined low moisture content into said excavator bucket;
g) retracting said bucket under positive pressure within said housing;
h) closing said openable door attached to said housing;
i) lifting of said positively pressurized housing with said bucket with to the surface with said dredged contaminated sediments having said low moisture content; and,
j) disposing of said contaminated sediments with said low moisture content to a disposal site.

DESCRIPTION OF THE DRAWINGS

The present invention can best be understood in conjunction with the accompanying drawings, in which.

DESCRIPTION OF THE PREFERRED EMBODIMENT

Figure 1:
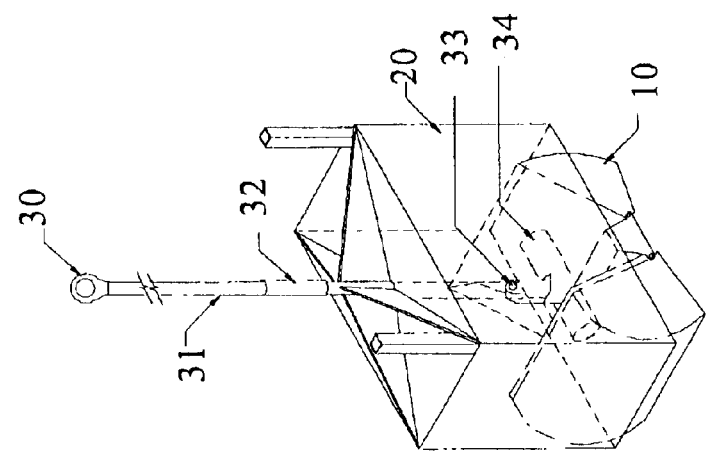
FIG. 1 is a schematic of the enclosed excavator, which consists of a mechanical dredge or bucket situated within a pressure-controlled enclosure.

As shown in FIG. 1, the process is affected by a clamshell-type bucket 10 housed within a pressure-controlled enclosure 20. Both the enclosure and dredge bucket contained within the enclosure can be lowered with a lifting shackle 30, and connected to a dredge bucket shaft 31 by means of a clevis and pin 33. The dredge bucket shaft 31 guided into the top of the enclosure by a stuffing box 32 to prevent leakage into the shaft or loss of pressure inside the enclosure. The dredge bucket is opened and closed by means of a hydraulic piston 34.

Figure 2:
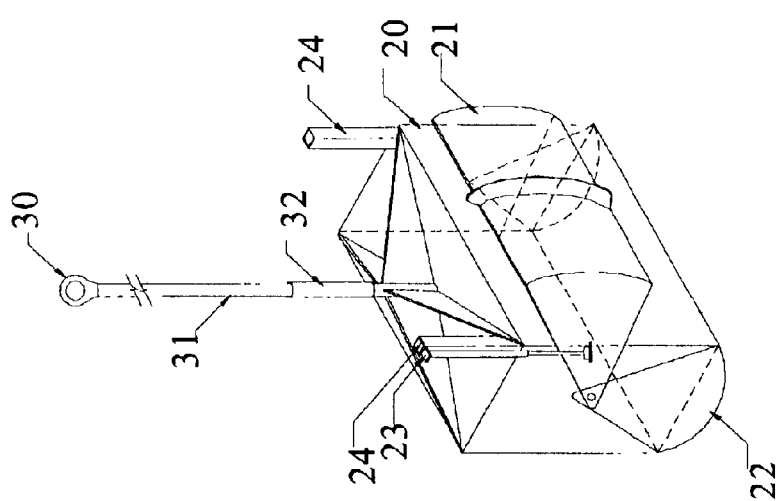
FIG. 2 is a schematic of the enclosure's unique single-hinged door shown in a fully opened and fully closed position.

As shown in FIG. 2, in this sealed sediment excavator embodiment, the pressure-controlled enclosure 20 is outfitted with a rotating single-hinged door depicted in FIG. 2 in both the fully opened 21 and fully closed positions 22. This door would typically be in the open position during the submersion cycle of the operation, and in the closed position following the excavation process or recovery cycle. The door would be closed as soon as the enclosure 20 is clear of the bottom. It remains closed as the enclosure is lifted from the bottom and reopened prior to the sediment load being discharged to a top surface dredge barge or other container designed to collect and dispose of the dredged material.

The single-hinged door can be opened and closed with a door control piston 23, which is attached to piston support columns 24.

Figure 3:
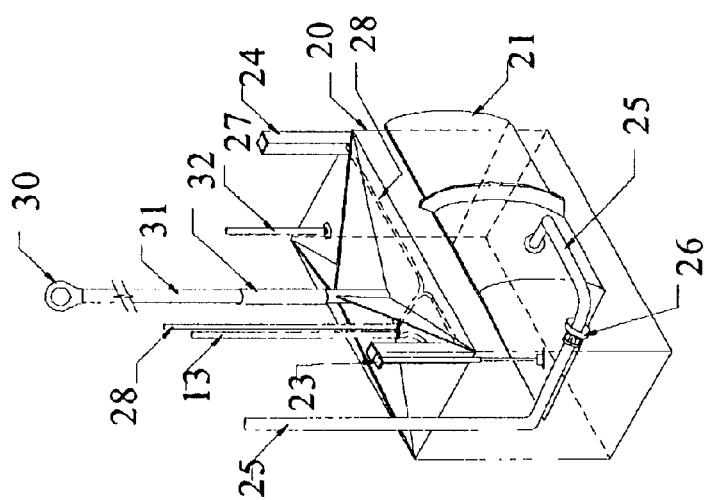
FIG. 3 is a schematic showing the pneumatic, pumping, hydraulic, and mechanical controls associated with the enclosure.

As shown in FIG. 3, depicting the sealed sediment extractor embodiment, the rotating single-hinged door 21 is outfitted with a water pump line 25 and a submersible pump 26 or surface supplied pump (not shown) that can evacuate water that drains from the excavated sediment during the recovery cycle of the operation. A pneumatic pressure line 27 is incorporated into the design to control the air pressure within the enclosure. Access is provided for the hydraulic bucket control lines 13, which are used to open and close the dredge bucket and the hydraulic door control lines 28, which are used to drive the door control pistons. The hydraulic lines used to drive the pump and the hydraulic lines for the dredge bucket are not shown on the drawings, but are also be included as part of the system.

Operation of the system to remove solids, where the primary objective is to minimize moisture control of extracted sediments, can be effected with the aforementioned system where such a system is maintained in a pressurized mode equivalent or greater than that of the hydrostatic pressure imposed by the surrounding water column.

This positive air pressure is introduced into controlled enclosure 20 by pneumatic pressure line 27 connected to a source of air pressure continuously and sequentially applying a positive pressure equal to a predetermined external hydrostatic pressure imposed by a surrounding water column surrounding controlled enclosure 20. This positively applied pressure is applied from the source of positively pressurized air during a first mode of deployment (submergence) of lowering the excavator bucket 10 within controlled enclosure 20 to the sediment sample at the bottom of the surrounding water column. The positively applied air pressure is also applied during a second mode (excavation) of the excavator bucket 10 excavating aquatic sediments having the predetermined low moisture content and also during a third mode (retrieval) of removal of the excavator bucket 10 containing the dredged aquatic sediments having the low moisture content.

Although the aforementioned particular embodiments are shown and described herein, it is understood that various other modifications may be made without departing from the scope of the invention, as noted in the appended claims.

We claim:

1. A system for dredging contaminated aquatic sediments with a predetermined low moisture content, wherein said dredged sediments have a moisture content closely approximating a predetermined in-situ moisture content of the sediment sample prior to dredging, comprising:

an excavator enclosed in a water-retaining housing; said housing comprising a pressure-controllable enclosure (20) having a source of air pressure continuously and sequentially applying a positive pressure equal to a predetermined external hydrostatic pressure imposed by a surrounding water column surrounding said housing, said positively applied pressure being applied from said source of positively pressurized air during a first mode of deployment of said excavator to the sediment sample, during a second mode of excavating aquatic sediments having said predetermined low moisture content and during a third mode of removal of said excavator containing the dredged aquatic sediments having said low moisture content, said excavator being hingedly attached within said housing; said excavator being capable of pivoting and extending below the bottom of the housing and being capable of pivoting and retracting into the housing between an open and closed position, respectively.

2. The dredging system as in claim 1 wherein said excavator is an openable and closable clamshell-type dredge bucket (10) mounted within said housing enclosure (20).

3. The dredging system of claim 1, wherein said housing comprises a pneumatic pressurizer applying said positive pressurization of said pressure-controllable enclosure (20).

4. The dredging system of claim 1, wherein said housing includes a hydraulic piston (34) controlling opening and closing movements of said excavator.

5. The dredging system of claim 1, wherein said housing comprises a rotating door (21); said rotating door (21) being attached within said housing (20) with a single hinge, said rotating door (21) comprising a bottom of said housing (20) when said rotating door (21) is in said closed position.

6. The dredging system as in claim 1, wherein said housing (20) has at least one hydraulically actuated door control piston (23) mounted, respectively on at least one piston support column (24).

7. The dredging system as in claim 1, wherein said housing (20) has at least one submersible water pump (26) attached thereon, said at least one water pump (26) and said at least one water line (25) for evacuating water from said pressure controlled housing enclosure (20).

8. The dredging system as in claim 1, wherein said housing (20) has a surface supplied pump attached thereto, said surface supplied pump for evacuating water from said pressure controlled housing enclosure (20).

9. The dredging system as in claim 1, wherein said housing further comprises at least one pneumatic pressure line (27) for applying and controlling said positive air pressure within said pressure-controllable enclosure (20); said housing comprising at least one hydraulic pressure actuator line (28) for actuating and controlling said rotating door (21) between said open (21) and closed positions (22).

10. The dredging system as in claim 1, wherein said housing includes at least one lifting shackle (30) connected to at least one dredge bucket shaft (31); said dredge bucket shaft (31) being guided into the top of said housing (20) by means of at least one stuffing box (32); said at least one stuffing box (32) for leakage or loss of pressure inside said positive pressure-controllable enclosure (20); said housing comprising at least two hydraulic door control lines (28) for actuating and controlling said at least two door control pistons (23).

11. A method of dredging contaminated aquatic sediments with a low moisture content approximating a predetermined in situ low moisture content of the contaminated sediments, comprising the steps of:

enclosing a dredge excavator bucket within a sealed housing having an openable door for introducing and contacting said excavator bucket to the contaminated aquatic sediments;

providing a source of positive air pressure to said housing;

maintaining said positive air pressure at an amount equal to a predetermined hydrostatic pressure imposed by a surrounding water column surrounding said housing, thereby preventing the introduction of water from said surrounding water column into said housing;

submersing said housing having said excavator bucket down to the in situ contaminated sediments to be dredged;

collecting the contaminated sediments having said predetermined low moisture content into said excavator bucket;

retracting said excavator bucket under positive pressure within said housing;

closing said housing door;

lifting of said positively pressurized housing;

removal to the surface of said housing containing said excavator bucket and said dredged contaminated sediments having said low moisture content; and, disposing of said contaminated sediments with said low moisture content to a disposal site.

\* \* \* \* \*